United States Patent [19]
Kwan

[11] Patent Number: 5,865,885
[45] Date of Patent: *Feb. 2, 1999

[54] HYDROPHILIC TREATMENT OF PIGMENTS

[75] Inventor: Wing Sum Vincent Kwan, Deerfield, Ill.

[73] Assignee: Videojet Systems International, Inc., Wood Dale, Ill.

[*] Notice: This patent issued on a continued prosecution application filed under 37 CFR 1.53(d), and is subject to the twenty year patent term provisions of 35 U.S.C. 154(a)(2).

[21] Appl. No.: 727,687

[22] Filed: Oct. 8, 1996

[51] Int. Cl.⁶ ........................................ C09C 1/22
[52] U.S. Cl. ............................................... 106/460
[58] Field of Search ............................................. 106/460

[56] References Cited

U.S. PATENT DOCUMENTS

| | | | |
|---|---|---|---|
| 3,348,959 | 10/1967 | Csonka et al. | 106/471 |
| 3,398,113 | 8/1968 | Godshalk et al. | 260/41 |
| 4,160,760 | 7/1979 | Carr et al. | 260/42.21 |
| 4,277,288 | 7/1981 | Lawrence et al. | 106/309 |
| 4,545,821 | 10/1985 | Rau et al. | 106/291 |
| 4,913,063 | 4/1990 | Jonas et al. | 106/413 |
| 5,420,317 | 5/1995 | Laufenberg et al. | 554/163 |
| 5,501,732 | 3/1996 | Neidenzu et al. | 106/447 |

FOREIGN PATENT DOCUMENTS

| | | |
|---|---|---|
| 0 707 051 | 4/1996 | European Pat. Off. . |
| 2 281 410 | 3/1976 | France . |
| 2673838 | 9/1992 | France . |
| 1 959 233 | 6/1970 | Germany . |
| 2 043 629 | 3/1972 | Germany . |
| 2 313 073 | 9/1974 | Germany . |
| 51-082317 | 7/1976 | Japan . |
| 59-170130 | 9/1984 | Japan . |
| 59-170131 | 9/1984 | Japan . |
| 60-079068 | 5/1985 | Japan . |
| 62-267368 | 11/1987 | Japan ........................................ 106/460 |
| 6115945 | 4/1994 | Japan . |
| 6145025 | 5/1994 | Japan . |
| 07053910 | 2/1995 | Japan . |
| 07165986 | 6/1995 | Japan . |
| 8109022 | 4/1996 | Japan . |
| 1 287 576 | 8/1972 | United Kingdom . |
| 1 460 315 | 1/1977 | United Kingdom . |
| 1 494 746 | 12/1977 | United Kingdom . |

OTHER PUBLICATIONS

PCT Search Report, Dec. 10, 1996, (GB 96/02415).
Hawley's Condensed Chemical Dictionary, 11$^{th}$ ed. pp. 695 and 838, Van Nostrand, NY, 1987 (no month).
Hyperdispersants, Schofield, J.D., Surface Coatings Institute (JOCCA), 74(6), pp. 204, 206–10, Jun. 1991.
A Model for Organic pigments in Oil or Water–Based Printing Inks, Hays, B.G., Am. Ink Maker, v. 64, pp. 13–21, Oct. 1986.

*Primary Examiner*—Mark L. Bell
*Assistant Examiner*—Scott L. Hertzog
*Attorney, Agent, or Firm*—Leydig, Voit & Mayer, Ltd.

[57] ABSTRACT

A surface coordinating agent is allowed to contact an aqueous slurry of transition metal-containing pigment particles to increase the hydrophilicity of the surface of such particles. The modified pigment particles disperse easily in a wide variety of solvents, and provide stable, dispersions having a small mean pigment particle size and narrow particle size distribution.

29 Claims, No Drawings

HYDROPHILIC TREATMENT OF PIGMENTS

FIELD OF THE INVENTION

The present invention relates generally to the field of pigments. More specifically, the present invention is directed towards a method of treating pigment particles to render them hydrophilic for use in pigment dispersions that may utilize a wide variety of solvents or vehicle systems.

BACKGROUND OF THE INVENTION

Pigments that are used in polar environments must be readily dispersible and must be hydrophilic. Among the most important pigments are those comprised of a transition metal or an oxide or complex thereof. Accordingly, it is important for certain applications to be able to render hydrophilic or to increase the hydrophilicity of the surface of such transition metal-containing pigment particles.

Treatments to render iron-containing materials hydrophobic are known and are used to render the iron-containing pigments suitable for use in many ink applications; however, most of the applications for iron-containing materials, especially iron oxide, are hydrophilic (as in paint). Though the surface of most iron-containing materials inherently is hydrophilic in nature, a further increase in surface hydrophilicity will lead to more compatibility with the polar vehicle systems used in various applications.

Thus, a need exists for a fast and economical way to render hydrophilic or to increase the hydrophilicity of the surface of transition metal-containing pigment particles, so that such particles can be easily dispersed in a wide variety of solvents or vehicle systems. Such a need is met by the method of the present invention.

BRIEF SUMMARY OF THE INVENTION

In accordance with the present invention, a surface coordinating agent is allowed to contact transition metal-containing pigment particles, as in the form of an aqueous slurry, to increase the hydrophilicity of the surface of such particles.

The pigment particles thus modified by the surface coordinating agent can then be recovered by conventional means, such as by filtration, and dried to obtain dry modified pigment particles. The modified pigment particles can then be dispersed in a wide range of solvents or vehicles, as by first adding a solvent or vehicle to the dry modified pigment particles to make a pigment concentrate, and then dispersing the pigment concentrate in the solvent or vehicle of choice.

The modified pigment particles disperse easily in a wide variety of organic solvents and vehicles, and provide stable, dispersions having a small mean pigment particle size and narrow particle size distribution. Typically the median particle size will be up to about 0.3 micron for most pigments. For some iron oxide pigments the median particle size may be up to about 0.7 micron.

DESCRIPTION OF THE PREFERRED EMBODIMENTS

In one general embodiment, in accordance with the present invention, there is provided a method for preparing modified pigment particles, selected from the group consisting of transition metal containing pigment particles, transition metal oxide containing pigment particles, and complexes of transition metals or transition metal oxides, said method comprising contacting said pigment particles, as in the form of an aqueous slurry, with a surface coordinating agent.

Usually, such a method of preparing modified pigment particles will comprise:

(a) preparing an aqueous slurry of pigment particles selected from the group consisting of transition metal containing pigment particles, transition metal oxide containing pigment particles, and complexes of transition metals or transition metal oxides, such that the pigment particles are present in an amount from about 1% to about 20% by weight of the slurry;

(b) adding a surface coordinating agent, to the slurry in an amount less than about 10% by weight of the pigment particles;

(c) mixing the surface coordinating agent into the slurry to obtain modified pigment particles; and (e) optionaly, recovering and drying the modified pigment particles.

The resulting pigment particles may be used to prepare a pigment concentrate by adding a vehicle to the modified pigment particles. A pigment dispersion may be made from the concentrate by dispersing the concentrate in one or more solvents. Such solvents may include ketones such as acetone or methylethylketone; alkanols such as ethanol or ethylene glycol, ethers such as diethylether; esters such as ethylacetate, and acetonitrile.

The present invention thus, in one embodiment, provides a pigment dispersion, comprising:

(a) pigment particles selected from the group consisting of transition metal containing pigment particles, transition metal oxide containing pigment particles, and complexes of transition metals or transition metal oxides, (b) a surface coordinating agent comprising a phenol having at least one additional polar group;

(c) a vehicle; and (d) optionally one or more additional solvents, selected from the group consisting of methylethylketone, ethanol, alkanol, water, ethers, and ethylene glycols.

In a specific embodiment, the present invention is directed to modified pigment particles that contain iron. Thus, in accordance with such an embodiment, there is provided a general method of preparing such modified pigment particles, selected from the group consisting of iron containing pigment particles, iron oxide containing pigment particles, and complexes of iron or iron oxides.

The present invention will thus provide a pigment dispersion of iron-containing pigments comprising:

(a) pigment particles selected from the group consisting of iron containing pigment particles, iron oxide containing pigment particles, and complexes of iron or iron oxides, (b) a surface coordinating agent comprising a phenol having at least one additional polar group;

(c) a vehicle; and (d) optionally one or more additional solvents, selected from the group consisting of methylethylketone, ethanol, alkanol, water, ethers, and ethylene glycols.

Pigments

The pigments that are useful in the present invention are those that comprise transition metals, transition metal oxides or complexes thereof. Thus, the pigments may be pure metal, such as iron or cobalt. Alternatively, the pigments may comprise ferromagnetic powders, such as Fe-Co, Fe-Co-Ni, Fe-Co-Co-Ni, Fe-Co-B, Fe-Co-Cr-B, Mn-Bi, Mn-Al, Fe-Co-V alloys, bronze powder, and other alloys of transition metals. In some instances, for example, iron, the metal surface will consist largely of the metal oxide, under ambient conditions.

Transition metal oxides may include cubic iron oxide, acicular iron oxide, gamma-Fe$_2$O$_3$, and mixed crystals of gamma-Fe$_2$O$_3$ and Fe$_3$O$_4$ any of which may be doped with cobalt, barium ferrite, strontium ferrite, cuprous oxide or other oxides that are useful as pigments.

The transition metal complexes may include all formulations, or shades, of lead chromate (such as Chrome Yellow, Molybdate Orange), iron ferrocyanate complex (such as Iron Blue) and pigments of similar formulae, cobalt blue, solitan yellow and other such recognized pigment complexes.

The Surface Coordinating Agent

Phenols

The surface coordinating agents that may be used in the present invention may be any phenol that has an additional polar group. In general, chemicals bearing the following structure are usable:

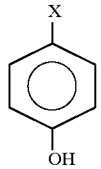

where X=sulphonic acid and their acid salts, carboxylic acid and their acid salts, amines, alkylated amines, and their cationic salts, heterocycles having nitrogen atoms. X can be meta or para to the hydroxy group. The polar group can also be separated from the phenyl ring by one or more carbon, oxygen or nitrogen atoms as in the case of tyramine hydrochloride or 8-hydroxyjuloidinium salt.

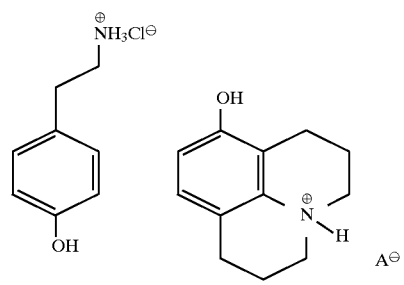

The ring may also contain more than one polar groups as in the case of 5-hydroxyisophthalic acids.

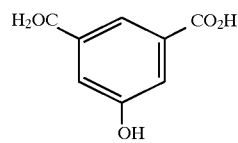

Moreover, the polar groups need not be of the same charge. Examples of phenol containing polar groups of opposite charges include Tyrosine and Tyramine hydrochloride.

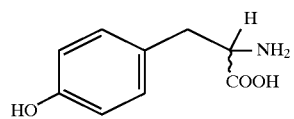

The central phenyl ring may also contain more than one hydroxyl functionalities as in the case of 1,2-dihydroxybenzene-3,5-disulfonic acid disodium salts.

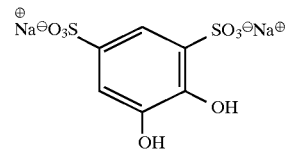

The phenol functionality may belong to part of another heterocycle or ring system. Examples falling into this category include 5-hydroxyindole-3-acetic acid, diethylammonium salts and 8-hydroxy-7-5 iodoquinoline-5-sulfonic acid.

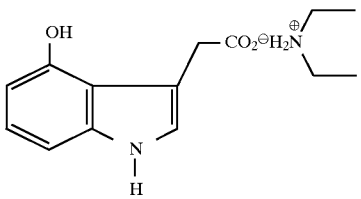

Other Coordinating Agents

As an alternative to phenol compounds, compounds containing a 1,2 diketo moiety and at least one polar group may be used. Such compounds include oxalic acid, having the formula:

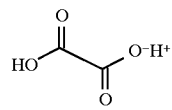

and oaxalic acid, disodium salt, having the formula:

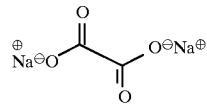

As another alternative to phenol compounds, compounds containing a 1,3-diketo moiety and at least one polar group may be used. Such compounds include acetoacetic acid, having the formula:

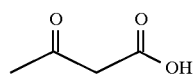

and acetoacetic acid, sodium salts, having the formula:

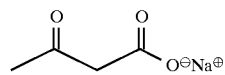

Yet another alternative coordinating agent may be any compounds containing a beta-hydroxy-keto moiety and at least one polar group. Such compounds include citric acid, trisodium salt, having the formula:

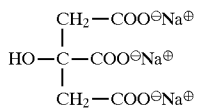

A further alternative coordinating agent may be compounds containing a phosphonic acid moiety and at least one other polar group. Such compounds include those having the formula:

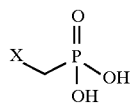

wherein

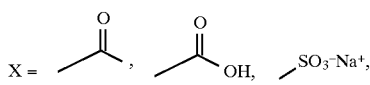

or other polar group.

Method of Contacting

This method comprises contacting the pigment particles with a coordinating agent, as by preparing an aqueous slurry of pigment particles, optionally heating the slurry, and adding a surface coordinating agent; stirring the solution, optionally cooling the heated solution, and recovering the pigment particles modified by the surface coordinating agent. Typically, the surface coordinating agent is mixed into the slurry at a temperature from about 50° C. to about 70° C.

Recovery may be by means of filtration or other suitable means. The recovered, modified pigment particles may then be washed and dried.

The aqueous slurry should contain pigment particles in an amount from about 1% up to about 20%, by weight of the slurry. Preferably, the slurry should contain from about 8% to about 12% by weight of pigment particles. If the pigment particles contain iron, then the pigment may be present in an amount from about 1% to about 50%, by weight of the slurry.

The slurry that is employed in accordance with the present invention may be that obtained in the manufacturing process for the pigment, as many of the transition metal pigments are initially produced in an aqueous environment. The desired aqueous slurry, however, can be prepared by redispersing a presscake or even dry pigment powder into water. It is preferred not to use dry pigment, if possible, as the dried pigment may already contain irreversible agglomeration.

After the pH of the slurry is optionally adjusted, the surface coordinating agent should be added, and the resulting solution should be stirred for a time sufficient to contact the coordinating agent with the pigment particles. Such contact occurs more quickly under the influence of heat. Therefore, it is preferred that the slurry be heated, prior to, during, or after the addition of the coordinating agent, and that the mixture of pigment and coordinating agent be stirred under the influence of heat. Although the temperature in this step is not critical, it should be below the temperature at which degradation of the pigment occurs.

Further, as stated above, as the temperature of the surface coordinating agent/pigment solution increases, the amount of mixing time needed to contact the coordinating agent with the pigment decreases. Thus, to minimize the amount of mixing time required, the preferred temperature range usually is from about 55° C. to about 70° C. When this temperature range is used, the time necessary to contact the coordinating agent with the pigment particles is from about 5 minutes to about 30 minutes. The temperature and time required in any particular situation will vary depending upon the particular pigment and coordinating agent that is used.

After the surface coordinating agent has been added, and the solution stirred sufficiently to contact the coordinating agent with the pigment particles, the solution, if it has been heated, may be cooled if desired, and filtered, if necessary, by conventional means, to obtain wet modified pigment particles. These wet modified particles may then be washed with water, preferably deionized water, and dried by conventional means, to obtain dry modified pigment particles. These particles then can be dispersed into a solvent system to create a pigment dispersion. Such dispersions may be prepared as described below. Of course, other means for recovering the pigment may be employed, such as sedimentation and decantation. Further, if desired, wet pigment may be otherwise treated to remove water, as by contact with organic solvents that are miscible with water, or the like.

Different sequences of applying the coordinating agent have to be used depending on the acidity of the initial pigment slurry. For slightly acidic or neutral slurries, the coordinating agent can be added to the slurry prior to heating, which allows the chemical modification to take place. However, for strongly acidic slurry, the coordinating agent is not effective in the liquid medium due to the acidity. Instead of carrying out the chemical modification in the slurry state, the pigment can first be allowed to come into contact with the modifying agent and the mixture thoroughly mixed. The pigment, which is believed to have the modifier physically adsorbed onto the surface, can then be filtered and washed. The pigment can then be dried, as at 80°–100° C., allowing the chemical modification to take place in the solid state.

Formation of the Ink or Dispersion

The modified pigment can be mixed with a vehicle to obtain a pigment concentrate, which can then be dispersed in various solvent systems, to create a pigment dispersion. These pigment dispersions find uses in aqueous based inks; coatings, including but not limited to paints; colorants; and flat screen display devices.

The pigment can be dispersed in a wide variety of solvents depending on the application. If the solvent is ethanol, the modified pigment can be first mixed with a concentrated solution of Shellac R-45 in ethanol, and then diluted in ethanol. If a hydrophobic solvent (e.g. Isopar G) is desirable, the pigment can be first mixed with a hydrophobic varnish like LV-1830 (Lawter International, Northbrook, Ill.) or Blendmax 322 (Central Soya, Fort Wayne, Ind.) and the pigment concentrate can then be dispersed in Isopar G. The solvent is not critical so long as the dispersing varnish or vehicle is compatible with the solvent.

The vehicle preferably is added in an amount sufficient to obtain a ratio of modified pigment to vehicle of about 1:0.8 by weight or less.

The pigment concentrate can then be dispersed in various solvent systems. Although sonication of the dispersion is not necessary, it is preferred to aid dispersion of the pigment into the solvent. Useful solvent systems include ketones such as acetone or methylethylketone; alkanols such as ethanol or ethylene glycol, ethers such as diethylether; esters such as ethylacetate, and acetonitrile provided that the solvent is compatible with the dispersing vehicle.

Benefits Gained from the Present Invention

The modified pigments obtained in accordance with the present invention have the following advantages.

a. The surface of the pigment is rendered hydrophilic.

b. As the pigment preferably is modified while it is still in its non-agglomerated state, it is protected against secondary agglomeration during the drying process. The resultant pigment will be easier to disperse in polar vehicles, having greater compatibility with the vehicle systems, yielding smaller particle size in the dispersion, and hence giving rise to a more stable dispersion.

In addition, there are some added advantages specifically associated with the added hydrophilicity of the pigment particles:

1. The color of the pigment when used in a finished coating is enhanced.
2. The modified pigment is more resistant to air-oxidation.
3. The modified pigment is more resistant to acids and bases.

Although the degree of hydrophilicity of a pigment is difficult to quantify, it can be inferred by the above properties imparted to the pigment.

EXAMPLES

For use in the present examples, 4-hydroxybenzosulphonic acid, sodium salt and 4-hydroxybenzoic acid, sodium salt were obtained from Aldrich Company (Milwaukee, Wis.), and ethanol was obtained from Esso. Methylethylketone was obtained from Aldrich Chemical Company.

Example 1

Preparation of modified yellow iron oxide. To a slurry of 104 grams of yellow iron oxide (pigment content: 8.7%) was added 0.45 grams of 4-hydroxybenzosulphonic acid, sodium salts. The mixture was stirred at a high shear (1000 rpm) for 20 minutes. Upon completion, the yellow iron oxide was filtered, washed and dried under a circulating oven at 100 deg. C. for one hour. The yield was approximately 90%.

Example 2

Preparation of modified red iron oxide. The procedure in Example 1 was followed except that 100 grams of red iron oxide slurry and 0.71 grams of 4-hydroxybenzosulphonic acid, sodium salts were used instead.

Example 3

Preparation of modified iron blue. The procedure in Example 1 was followed except that 107 grams of red iron slurry and 0.19 grams of 4-hydroxybenzosulphonic acid, sodium salts were used instead.

Example 4

Preparation of films. For red and yellow iron oxide, 1.0 gram of iron oxide was mixed with 9.0 grams of an aqueous varnish (AP 9655, Lawter International, Northbrook, Ill.) and the mixture was sonicated for 10–15 minutes. Draw-downs of such inks were prepared on paper using a No. 8 Meyer rod. The films were then air-dried and subjected to calorimetric evaluation. For iron blue, similar procedure was followed except that 0.5 grams of pigment and 9.5 grams of varnish were used instead.

All pigments were prepared from their aqueous slurry forms. For red iron oxide, the iron oxide was allowed to come into contact with the coordinating agent at a temperature of 60°–65° C. The resulting slurry was filtered using a Buchner funnel. The pigment was then washed and air-dried; however, in the case of yellow iron oxide and iron blue pigment, the coordinating agent was added to the slurry and the slurry was stirred at high shear (1000–1500 rpm) at room temperature. The slurry was then filtered. The pigment was washed, and then dried under a convectional oven at 100° C. for an hour.

The effect of surface modification was monitored by use of two methods: particle size distribution, and calorimetric evaluation of films formed by such pigment in an aqueous-based coating vehicle. Particle size distribution was studied with a Horiba LA-900 Light Scattering Particle Size Analyzer (Horiba Company, GA). The pigment was allowed to disperse into water by sonication. The resulting solution was subjected to a light scattering particle size analyzer. For the evaluation of particle size, refractive indices of 2.40, 3.10 and 1.54 were used for yellow iron oxide, red iron oxide and iron blue pigment, respectively. The medium for measurement was ethanol, which has a refractive index of 1.36.

Colorimetric evaluation was performed by allowing the pigment to disperse in an aqueous-based coating vehicle (AP-9655, Lawter International, Northbrook, Ill.) to yield a dispersion of 10% pigment loading. Films of such dispersion were laid down on cardboard by a meyer bar (No. 7). The dried films were subjected to calorimetric evaluation by a spectrophotometer (Hunter Associates Laboratory, Reston, Va.).

Results and Discussion

Hydrophilic surface modification of these pigments will result in better compatibility with polar varnishes. This increase in compatibility is usually exemplified in two ways. First, a more stable dispersion can be formed for such pigment in a polar medium. Second, there will be better color development of such pigment when used as a colorant in a varnish.

To evaluate the first effect, a particle analyzer was used to examine the particle size distribution. A stable dispersion should show features like small mean particle sizes and uniform distribution.

Table 1 tabulates the findings of mean particle size and particle size distribution of the three pigments in water. Except for red iron oxide, all modified pigments enjoy smaller particle sizes and narrower particle size distribution. Despite the lack of significant reduction in the mean particle size of red iron oxide, its dispersion still exhibits a higher percentage of particles having a particle size 0.3 micron or below.

To study the effect of surface modification on color development of pigment, calorimetric parameters of films formed from dispersions of modified pigment in a polar varnish were measured and compared to their unmodified counterparts. Table 2 lists the results of such experiments. The significant data in this table is either the "a" or "b" values. For the case of red iron oxide, modified red iron oxide should show a higher positive value of a, whereas modified iron blue should reveal a more negative "b" value.

TABLE 1

Effect of hydrophilic surface treatment on mean particle size of Red, Yellow Iron Oxide and Iron Blue pigments in water. (Note 1)

|  | Red Iron Oxide | | Yellow Iron Oxide | | Iron Blue | |
| --- | --- | --- | --- | --- | --- | --- |
|  | Unmod. | Mod. | Unmod. | Mod. | Unmod. | Mod. |
| Mean Part. Size ($\mu$m) | 0.79 | 0.79–0.90 | 1.02 | 0.10 | 0.88 | 0.18 |
| % of Part. Less Than 0.3 $\mu$m | 0.3 | 16.1 | 6.6 | 94.4 | 20.0 | 92.5 |

Notes:
1. Particle size distribution was studied with a Horiba LA-900 Light Scattering Particle Size Analyzer (Horiba Company, GA). The pigment was allowed to disperse into water by sonication. The resulting solution was subjected to a light scattering particle size analyzer. For the evaluation of particle size, refractive indices of 2.40, 3.10 and 1.54 were used for yellow iron oxide, red iron oxide and iron blue pigment. The medium for measurement is ethanol, which has a refractive index of 1.36.

The results on Table 2 validates the postulated observation. The modified red iron oxide does show a slightly higher "a" value. And films of modified iron blue pigment does reveal a more negative value of "b". For the yellow iron oxide, the comparison is slightly more difficult because the unmodified yellow iron oxide was found to be non-uniformly dispersed under the same experimental conditions and no uniform films of such pigment could be cast onto the cardboard. Although no calorimetric comparison can be made out of the unmodified yellow iron oxide pigment, the fact that it cannot form a uniform film does indicate its inferiority towards dispersibility.

TABLE 2

L, a, b Values of films formed from unmodified and modified iron-containing pigments. (Note 1)

|  | Red Iron Oxide | | Yellow Iron Oxide | | Iron Blue | |
| --- | --- | --- | --- | --- | --- | --- |
|  | Unmod. | Mod. | Unmod. | Mod. | Unmod. | Mod. |
| L | 23.10 | 23.56 | n.d. | 47.86 | 4.81 | 4.82 |
| a | 28.20 | 28.63 | n.d. | 17.02 | 2.80 | 3.25 |
| b | 13.09 | 13.48 | n.d. | 27.19 | -2.20 | -3.44 |

Notes:
1. Films were caste from a dispersion of 10% (w/w) pigment dispersion in AP-9655, except in the case of iron blue, which is a 5% dispersion.
2. The colorimetric parameters of the unmodified yellow iron oxide were not determined because of the non-uniformity of the dispersion.

What is claimed is:

1. A method for preparing hydrophilic modified pigment particles, selected from the group consisting of transition metal containing pigment particles, transition metal oxide containing pigment particles, and complexes of transition metals or transition metal oxides, said method comprising contacting an aqueous slurry of said pigment particles with a surface coordinating agent selected from the group consisting of phenol compounds having at least one additional polar group, compounds containing a 1,2 diketo moiety and at least one polar group, compounds containing a 1,3-diketo moiety and at least one polar group, compounds containing a beta-hydroxy-keto moiety and at least one polar group, and compounds containing a phosphonic acid moiety and at least one other polar group.

2. The method of claim 1, wherein the surface coordinating agent is added in an amount less than about 10% by weight of the pigment particles.

3. A method of preparing hydrophilic modified pigment particles, comprising:

(a) preparing an aqueous slurry of pigment particles selected from the group consisting of transition metal containing pigment particles, transition metal oxide containing pigment particles, and complexes of transition metals or transition metal oxides, such that the pigment particles are present in an amount from about 1% to about 20% by weight of the slurry;

(b) adding a surface coordinating agent selected from the group consisting of phenol compounds having at least one additional polar group, compounds containing a 1,2 diketo moiety and at least one polar group, compounds containing a 1,3-diketo moiety and at least one polar group, compounds containing a beta-hydroxy-keto moiety and at least one polar group, and compounds containing a phosphonic acid moiety and at least one other polar group, to the slurry in an amount less than about 10% by weight of the pigment particles;

(c) mixing the surface coordinating agent into the slurry to obtain modified pigment particles; and (d) recovering and drying the modified pigment particles.

4. The method of claim 3, where the aqueous slurry of pigment particles contains from about 8% to about 12% pigment particles by weight of the slurry.

5. The method of claim 4, where the surface coordinating agent is added to the slurry in an amount less than about 5% by weight of the pigment particles.

6. The method of claim 5, where the surface coordinating agent is mixed into the slurry at a temperature from about 50° C. to about 70° C.

7. A method for preparing a pigment concentrate, comprising adding an organic vehicle to modified pigment particles prepared in accordance with claim 1.

8. The method of claim 7, wherein the organic vehicle is added in an amount sufficient to achieve a ratio of pigment particles to vehicle of about 1:0.8 or less by weight.

9. A method for preparing a pigment dispersion, comprising dispersing a concentrate prepared according to the method of claim 8 with one or more solvents selected from the group consisting of ketones, alkanols, ethers, and esters.

10. The method of claim 9, wherein the concentrate is present in an amount sufficient to achieve a mean pigment particle size in the dispersion of less than or equal to 0.3 microns.

11. A hydrophilic pigment dispersion, comprising:

(a) pigment particles selected from the group consisting of transition metal containing pigment particles, transition metal oxide containing pigment particles, and complexes of transition metals or transition metal oxides;

(b) a surface coordinating agent selected from the group consisting of phenols having at least one additional polar group, compounds containing a 1,2 diketo moiety and at least one polar group, compounds containing a 1,3-diketo moiety and at least one polar group, compounds containing a beta-hydroxy-keto moiety and at least one polar group, and compounds containing a phosphonic acid moiety and at least one other polar group;

(c) an organic vehicle; and (d) one or more solvents, selected from the group consisting of ketones, alkanols, ethers, and esters.

12. The pigment dispersion of claim 11, wherein the surface coordinating agent is added in an amount less than about 10% by weight of the pigment particles.

13. A method for preparing hydrophilic modified pigment particles, selected from the group consisting of iron containing pigment particles, iron oxide containing pigment particles, and complexes of iron or iron oxides, said method comprising contacting an aqueous slurry of said pigment particles with a surface coordinating agent selected from the group consisting of phenols having at least one additional polar group, compounds containing a 1,2 diketo moiety and at least one polar group, compounds containing a 1,3-diketo moiety and at least one polar group, compounds containing a beta-hydroxy-keto moiety and at least one polar group, and compounds containing a phosphonic acid moiety and at least one other polar group.

14. The method of claim 13, wherein the surface coordinating agent is selected from the group consisting of the following compounds:

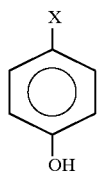

where X=sulphonic acid and its acid salts, carboxylic acid and its acid salts, amines, alkylated amines, and their cationic salts, and heterocycles having nitrogen atoms.

15. The method of claim 14, wherein the surface coordinating agent is added in an amount less than about 10% by weight of the pigment particles.

16. A method of preparing hydrophilic modified pigment particles, comprising:
(a) preparing an aqueous slurry of pigment particles selected from the group consisting of iron containing pigment particles, iron oxide containing pigment particles, and complexes of iron or iron oxides, such that the pigment particles are present in an amount from about 1% to about 20% by weight of the slurry;
(b) adding a surface coordinating agent selected from the group consisting of phenols having at least one additional polar group, compounds containing a 1,2 diketo moiety and at least one polar group, compounds containing a 1,3-diketo moiety and at least one polar group, compounds containing a beta-hydroxy-keto moiety and at least one polar group, and compounds containing a phosphonic acid moiety and at least one other polar group, to the slurry in an amount less than about 10% by weight of the pigment particles;
(c) mixing the surface coordinating agent into the slurry to obtain modified pigment particles; and
(d) recovering and drying the modified pigment particles.

17. The method of claim 16, wherein the surface coordinating agent is selected from the group consisting of the following compounds:

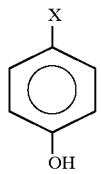

where X=sulphonic acid and its acid salts, carboxylic acid and its acid salts, amines, alkylated amines, and their cationic salts, and heterocycles having nitrogen atoms.

18. The method of claim 17, wherein the aqueous slurry of pigment particles contains from about 2% to about 50% pigment particles by weight of the slurry.

19. The method of claim 18, wherein the surface coordinating agent is added to the slurry in an amount less than about 10% by weight of the pigment particles.

20. The method of claim 19, wherein the surface coordinating agent is mixed into the slurry at a temperature from about 50° C. to about 70° C.

21. A method for preparing a pigment concentrate, comprising adding an organic vehicle to modified pigment particles prepared in accordance with claim 16.

22. The method of claim 21, wherein the organic vehicle is added in an amount sufficient to achieve a ratio of pigment particles to vehicle of about 1:0.8 or less by weight.

23. A method for preparing a pigment dispersion, comprising dispersing a concentrate prepared according to the method of claim 21 with one or more solvents selected from the group consisting of ketones, alkanols, ethers, and esters.

24. The method of claim 23, wherein the concentrate is present in an amount sufficient to achieve a mean pigment particle size in the dispersion of less than or equal to about 0.7 micron.

25. A hydrophilic pigment dispersion comprising:
(a) pigment particles selected from the group consisting of iron containing pigment particles, iron oxide containing pigment particles, and complexes of iron or iron oxides;
(b) a surface coordinating agent selected from the group consisting of phenols having at least one additional polar group, compounds containing a 1,2 diketo moiety and at least one polar group, compounds containing a 1,3-diketo moiety and at least one polar group, compounds containing a beta-hydroxy-keto moiety and at least one polar group, and compounds containing a phosphonic acid moiety and at least one other polar group;
(c) an organic vehicle; and
(d) one or more solvents, selected from the group consisting of ketones, alkanols, ethers, and esters.

26. The pigment dispersion of claim 25, wherein the surface coordinating agent is selected from the group consisting of the following compounds:

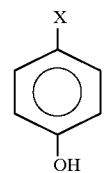

where X=sulphonic acid and its acid salts, carboxylic acid and its acid salts, amines, alkylated amines, and their cationic salts, and heterocycles having nitrogen atoms.

27. The pigment dispersion of claim 26, wherein the surface coordinating agent is added in an amount less than about 10% by weight of the pigment particles.

28. The method of claim 1, wherein said phenol compound has the formula:

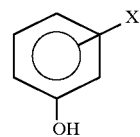

wherein X is selected from the group consisting of sulfonic acid and their salts, carboxylic acid and their salts amines, alkylated amines and their salts, and heterocycles having at least one nitrogen atom.

29. The method of claim 28, wherein X is meta or para to the OH group.

* * * * *